US012238675B2

(12) United States Patent
Hwang et al.

(10) Patent No.: US 12,238,675 B2
(45) Date of Patent: Feb. 25, 2025

(54) METHOD FOR TRANSMITTING, BY APPARATUS, CPM IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Jaeho Hwang, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 243 days.

(21) Appl. No.: 17/785,469

(22) PCT Filed: Jan. 8, 2021

(86) PCT No.: PCT/KR2021/000271
§ 371 (c)(1),
(2) Date: Jun. 15, 2022

(87) PCT Pub. No.: WO2021/141448
PCT Pub. Date: Jul. 15, 2021

(65) Prior Publication Data
US 2023/0017247 A1    Jan. 19, 2023

Related U.S. Application Data

(60) Provisional application No. 62/959,110, filed on Jan. 9, 2020.

(51) Int. Cl.
*H04W 24/00* (2009.01)
*G01S 5/02* (2010.01)
(Continued)

(52) U.S. Cl.
CPC ............ *H04W 64/003* (2013.01); *G01S 5/02* (2013.01); *G01S 19/07* (2013.01); *G01S 19/24* (2013.01); *G01S 19/40* (2013.01); *H04W 92/18* (2013.01)

(58) Field of Classification Search
CPC ..... H04W 64/003; H04W 92/18; H04W 4/40; H04W 4/023; H04W 4/44; H04W 4/46;
(Continued)

(56) References Cited

U.S. PATENT DOCUMENTS 9,048,960 B2 * 6/2015 Li ........................... H04W 4/46
11,516,669 B2 * 11/2022 Shimizu .................. H04W 4/40
(Continued)

FOREIGN PATENT DOCUMENTS

EP          3462754 A1    4/2019
KR     1020190097453 A    8/2019
(Continued)

*Primary Examiner* — Stephen M D Agosta
(74) *Attorney, Agent, or Firm* — BRYAN CAVE LEIGHTON PAISNER LLP

(57) ABSTRACT

Disclosed are, according to various embodiments, a method for transmitting, by a user equipment (UE), a first collective perception message (CPM) in a wireless communication system supporting a sidelink, and an apparatus therefor. Disclosed are the method and the apparatus therefor, the method comprising the steps of: obtaining first object information on surrounding objects through a sensor; receiving a second CPM including second object information; and transmitting the first CPM including the first object information and location information for the UE, wherein the second CPM further includes information on a location reliability of the second object information, the position information of the UE is corrected by applying an offset, based on the first object information and the second object information being object information for the same object, and the offset is determined by applying a ratio between a first position
(Continued)

reliability related to the position information of the UE and the second position reliability included in the second CPM to a distance between an object position based on the first object information and an object position based on the second object information.

11 Claims, 23 Drawing Sheets

(51) Int. Cl.
*G01S 19/07* (2010.01)
*G01S 19/24* (2010.01)
*G01S 19/40* (2010.01)
*H04W 64/00* (2009.01)
*H04W 92/18* (2009.01)

(58) Field of Classification Search
CPC . G01S 5/02; G01S 19/07; G01S 19/24; G01S 19/40; G01S 5/0264; G01S 5/0244; G01S 19/485
See application file for complete search history.

(56) References Cited

U.S. PATENT DOCUMENTS

| | | | |
|---|---|---|---|
| 2013/0278441 A1* | 10/2013 | Rubin | H04W 4/48 340/905 |
| 2014/0051346 A1* | 2/2014 | Li | H04W 4/46 455/3.01 |
| 2016/0112889 A1* | 4/2016 | Moon | H04B 7/0452 370/252 |
| 2016/0133128 A1* | 5/2016 | Koo | G08G 1/0112 701/117 |
| 2017/0072851 A1* | 3/2017 | Shenoy | G08G 1/096775 |
| 2017/0090036 A1* | 3/2017 | Zalewski | G01S 19/215 |
| 2017/0200370 A1* | 7/2017 | Miller | G08G 1/162 |
| 2017/0214747 A1* | 7/2017 | Schulte | H04L 67/12 |
| 2017/0243485 A1* | 8/2017 | Rubin | H04W 4/46 |
| 2018/0173229 A1* | 6/2018 | Huang | G01S 19/46 |
| 2018/0247537 A1* | 8/2018 | Oh | G05D 1/0293 |
| 2018/0365909 A1* | 12/2018 | Cheng | H04Q 9/00 |
| 2019/0051151 A1* | 2/2019 | Mueck | G08G 1/005 |
| 2019/0068639 A1* | 2/2019 | Alexander | H04W 4/46 |
| 2019/0098088 A1* | 3/2019 | Baltar | H04L 43/08 |
| 2019/0221110 A1* | 7/2019 | Vanderveen | G06V 20/58 |
| 2019/0356677 A1* | 11/2019 | Naserian | H04W 4/023 |
| 2019/0356685 A1* | 11/2019 | Naserian | H04W 4/40 |
| 2019/0357033 A1* | 11/2019 | Cheng | H04W 16/02 |
| 2020/0022013 A1* | 1/2020 | Nguyen | H04W 4/40 |
| 2020/0027333 A1* | 1/2020 | Xu | G08G 1/164 |
| 2020/0037126 A1* | 1/2020 | Lee | H04W 4/40 |
| 2020/0204969 A1* | 6/2020 | Full | H04W 4/38 |
| 2020/0228946 A1* | 7/2020 | Hwang | H04W 4/40 |
| 2020/0234574 A1* | 7/2020 | Park | G08G 1/0133 |
| 2020/0367096 A1* | 11/2020 | Hwang | H04W 74/0808 |
| 2020/0374053 A1* | 11/2020 | Hwang | H04W 4/40 |
| 2021/0067926 A1* | 3/2021 | Hwang | H04W 4/44 |
| 2021/0337431 A1* | 10/2021 | Pfadler | H04W 16/18 |
| 2022/0005353 A1* | 1/2022 | Hwang | H04W 4/40 |
| 2022/0014946 A1* | 1/2022 | Merwaday | H04B 7/0695 |
| 2022/0103986 A1* | 3/2022 | Hwang | H04W 4/44 |
| 2022/0107382 A1* | 4/2022 | Hwang | G01S 5/0072 |
| 2023/0325225 A1* | 10/2023 | Agarwal | G06F 12/1466 718/1 |

FOREIGN PATENT DOCUMENTS

| | | | | |
|---|---|---|---|---|
| KR | 10-2019-0109333 | | 9/2019 | |
| KR | 1020190107277 A | | 9/2019 | |
| KR | 10-2019-0120105 | | 10/2019 | |
| WO | 2018064179 A1 | | 4/2018 | |
| WO | 2018128946 A1 | | 7/2018 | |
| WO | 2018230768 A1 | | 12/2018 | |
| WO | WO 2018/230768 | * | 12/2018 | ............ G01S 19/40 |

* cited by examiner (a)

(b)

(a)

(b)

(a)

(b)

(a)

(b)

(a)

(b)

(a)

(b)

METHOD FOR TRANSMITTING, BY APPARATUS, CPM IN WIRELESS COMMUNICATION SYSTEM SUPPORTING SIDELINK, AND APPARATUS THEREFOR

This application is the National Stage filing under 35 U.S.C. 371 of International Application No. PCT/KR2021/000271 filed on Jan. 8, 2021, which claims priority to U.S. Provisional Application No. 62/959,110 filed on Jan. 9, 2020, the contents of which are all hereby incorporated by reference herein in their entirety.

TECHNICAL FIELD

The present disclosure relates to a method and a device therefor for transmitting a collective perception message (CPM) including position information corrected based on a received CPM by a device in a wireless communication system for supporting sidelink.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and device for largely improving global positioning system (GPS) performance by performing matching between object information of the received CPM and a sensed object and correcting the position of a vehicle according to a matching result and minimizing mismatch of object information with a neighbor device by transmitting a CPM including the corrected position information when a surrounding object acquired from the received CPM is determined to be the same as an object sensed by the vehicle.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

According to an aspect, a method of transmitting a first collective perception message (CPM) by a user equipment (UE) in a wireless communication system includes acquiring first object information about a surrounding object through a sensor, receiving a second CPM including second object information, and transmitting the first CPM including the first object information and position information of the UE, wherein the second CPM further includes information on a location reliability of the second object information, the position information of the UE is corrected by applying an offset, based on the first object information and the second object information being object information for the same object, and the offset is determined by applying a ratio between a first position reliability related to the position information of the UE and the second position reliability included in the second CPM to a distance between an object position based on the first object information and an object position based on the second object information.

The first object information may be determined to be related to the same object as the second object information based on the distance less than a preconfigured threshold, and the preconfigured threshold may be determined by applying a weight corresponding to reliability of the position information of the UE to a specific value determined based on reliability of the sensor.

The first position reliability may be determined based on reliability of a global positioning system (GPS) for acquiring the position information of the UE and a number of corrections of the position information of the UE.

The offset may be determined by multiplying a value, obtained by dividing the first position reliability by a sum of the first position reliability and the second position reliability, by the distance.

The first CPM may further include information about the offset.

When the second CPM is received from a road side unit (RSU), the offset may be determined as a value corresponding to the distance.

According to another aspect, a method of transmitting a first collective perception message (CPM) by a user equipment (UE) in a wireless communication system includes acquiring first object information about a surrounding object through a sensor, receiving a second CPM including second object information, and transmitting the first CPM including the first object information and position information of the UE, wherein an offset may be applied to the position information of the UE when the first object information and the second object information are determined to be object information about the same object.

According to another aspect, a user equipment (UE) for transmitting a first collective perception message (CPM) in a wireless communication system includes a radio frequency (RF) transceiver, and a processor connected to the RF transceiver, wherein the processor acquires first object information about a surrounding object through a sensor and controls the RF transceiver to receive a second CPM including second object information and to transmit the first CPM including the first object information and position information of the UE, the second CPM further includes information about position reliability of the second object information, the position information of the UE is corrected by applying an offset when the first object information and the second object information are object information about the same object, and the offset is determined by applying a ratio between the first position reliability related to the position information of the UE and the second position reliability included in the second CPM to a distance between an object position based on the first object information and an object position based on the second object information.

The first object information may be determined to be related to the same object as the second object information based on the distance less than a preconfigured threshold, and the preconfigured threshold may be determined by applying a weight corresponding to reliability of the position information of the UE to a specific value determined based on reliability of the sensor.

The first position reliability may be determined based on reliability of a global positioning system (GPS) for acquiring the position information of the UE and a number of corrections of the position information of the UE.

Even if the first object information and the second object information are object information about the same object, when the second position reliability is less than a preconfigured threshold, the offset may not be applied to the position information of the UE.

According to another aspect, a chip set for transmitting a first collective perception message (CPM) in a wireless communication system for supporting sidelink includes at least one processor, and at least one memory operatively connected to the at least one processor and configured to cause the at least one processor to perform an operation when executed, wherein the operation includes acquiring first object information about a surrounding object through a sensor, receiving a second CPM including second object information, and transmitting the first CPM including the first object information and position information of the UE, the second CPM further includes information about position reliability of the second object information, the position information of the UE is corrected by applying an offset when the first object information and the second object information are determined to be object information about the same object, and the offset is determined by applying a ratio between the first position reliability related to the position information of the UE and the second position reliability included in the second CPM to a distance between an object position based on the first object information and an object position based on the second object information.

The processor may generate a control signal related to autonomous driving based on the second CPM.

According to another aspect, a computer readable storage medium containing at least one computer program for causing the at least one processor to perform an operation for transmitting a first collective perception message (CPM) by at least one processor in a wireless communication system for supporting sidelink includes at least one computer program configured to cause the at least one processor to perform the operation of transmitting the first CPM, and a computer readable storage medium configured to store the at least one computer program therein, wherein the operations includes acquiring first object information about a surrounding object through a sensor, receiving a second CPM including second object information, and transmitting the first CPM including the first object information and position information of the UE, the second CPM further includes information about position reliability of the second object information, the position information of the UE is corrected by applying an offset when the first object information and the second object information are determined to be object information about the same object, and the offset is determined by applying a ratio between the first position reliability related to the position information of the UE and the second position reliability included in the second CPM to a distance between an object position based on the first object information and an object position based on the second object information.

Advantageous Effects

Various embodiments may largely improve global positioning system (GPS) performance by performing matching between object information of the received CPM and a sensed object and correcting the position of a vehicle according to a matching result and may minimize mismatch of object information with a neighbor device by transmitting a CPM including the corrected position information when a surrounding object acquired from the received CPM is determined to be the same as an object sensed by the vehicle.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
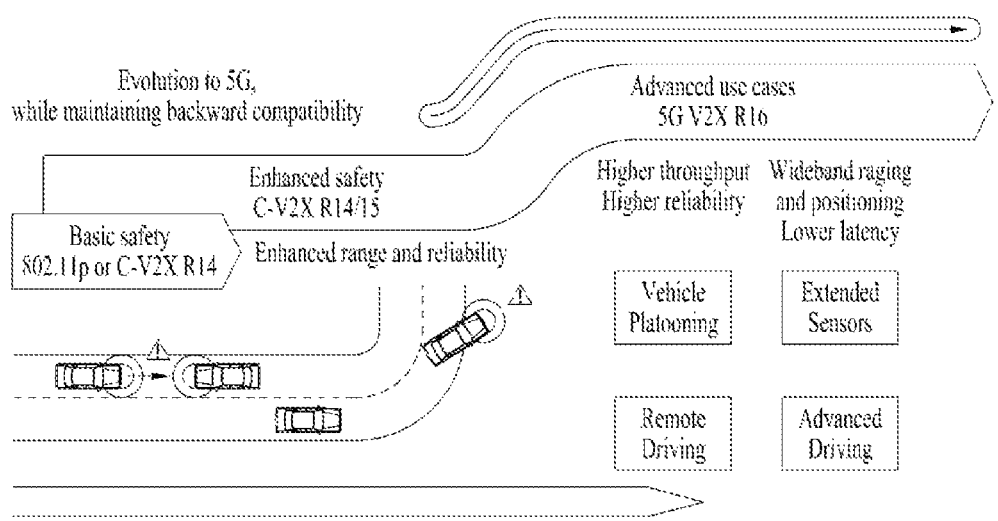
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
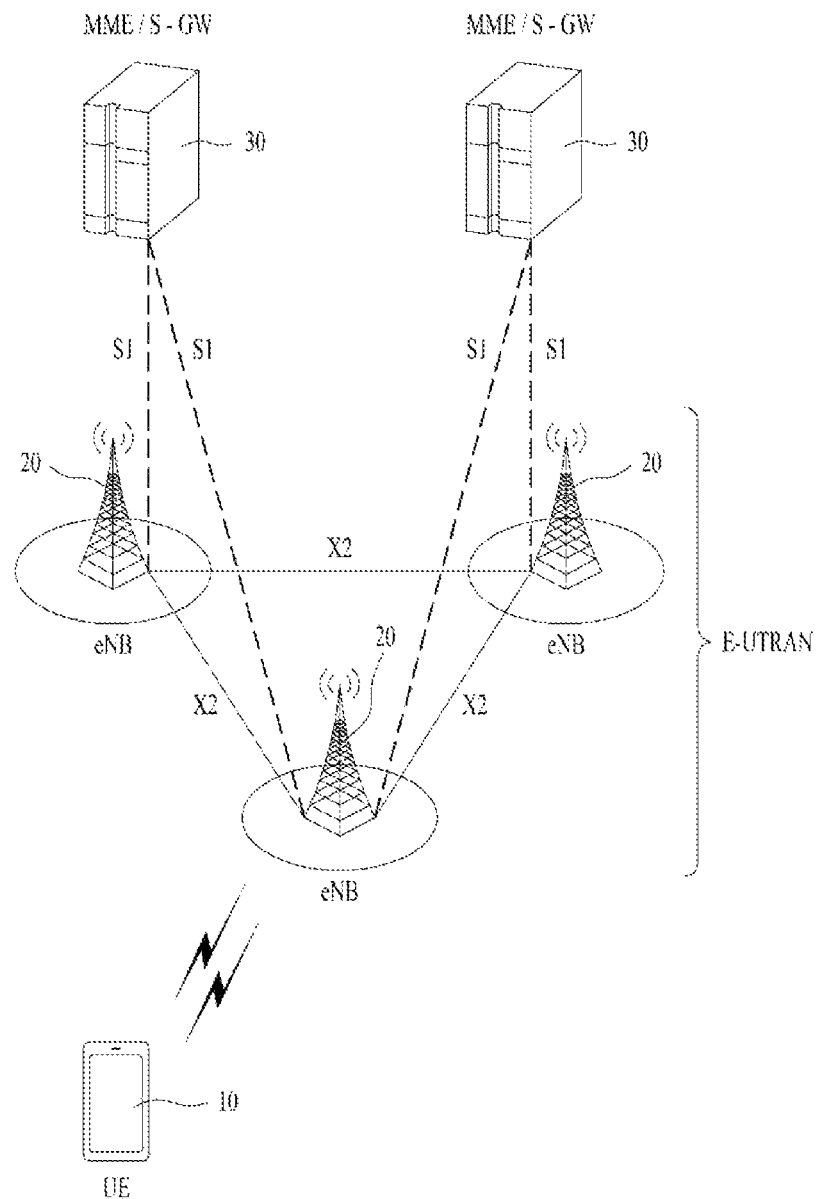
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
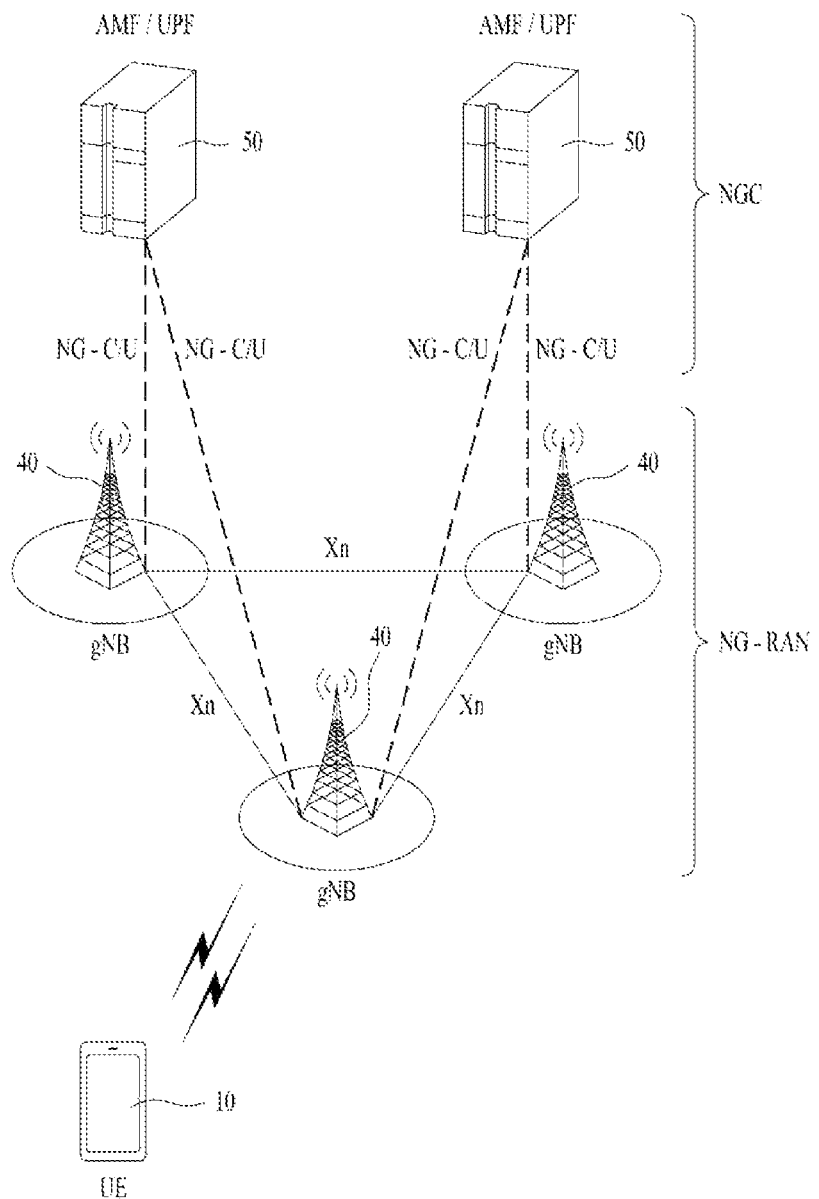
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5 GC) via an NG interface. More specifically, the gNB and the eNB are connected to an access and mobility management function (AMF) via an NG-C interface and to a user plane function (UPF) via an NG-U interface.

Figure 4:
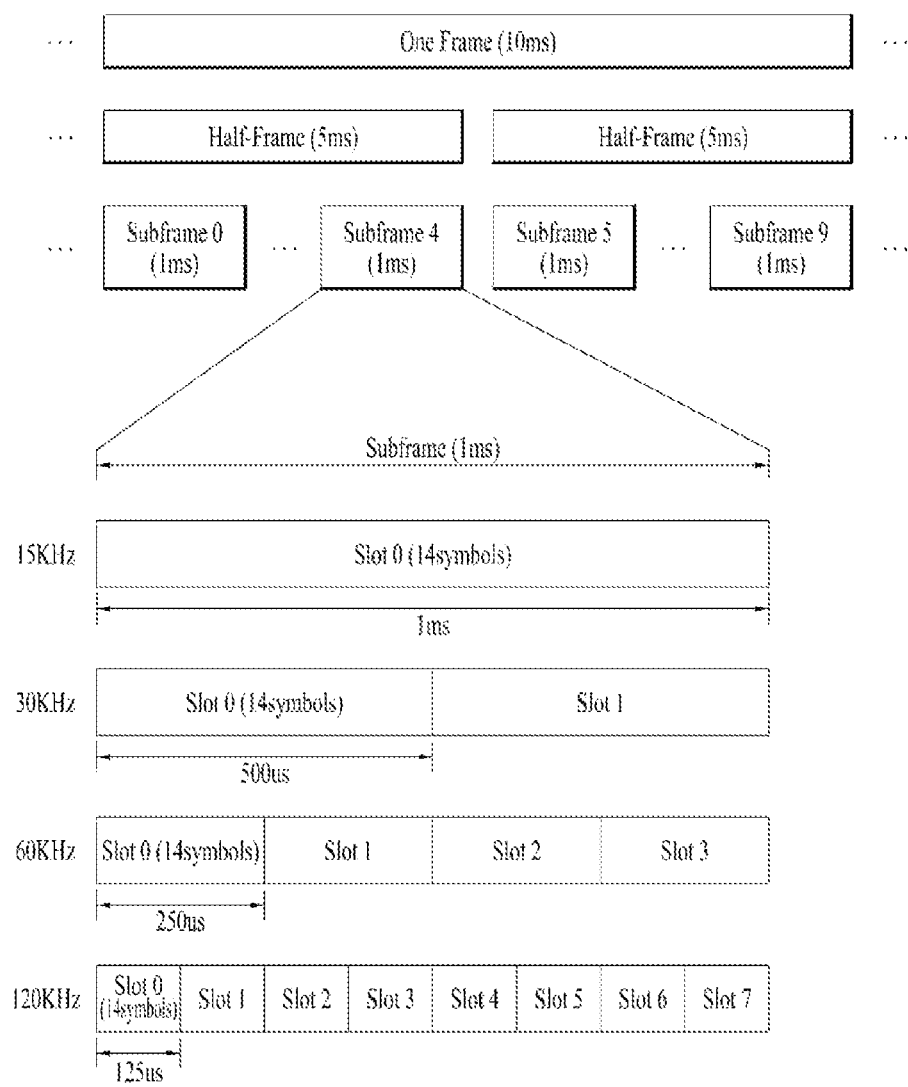
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
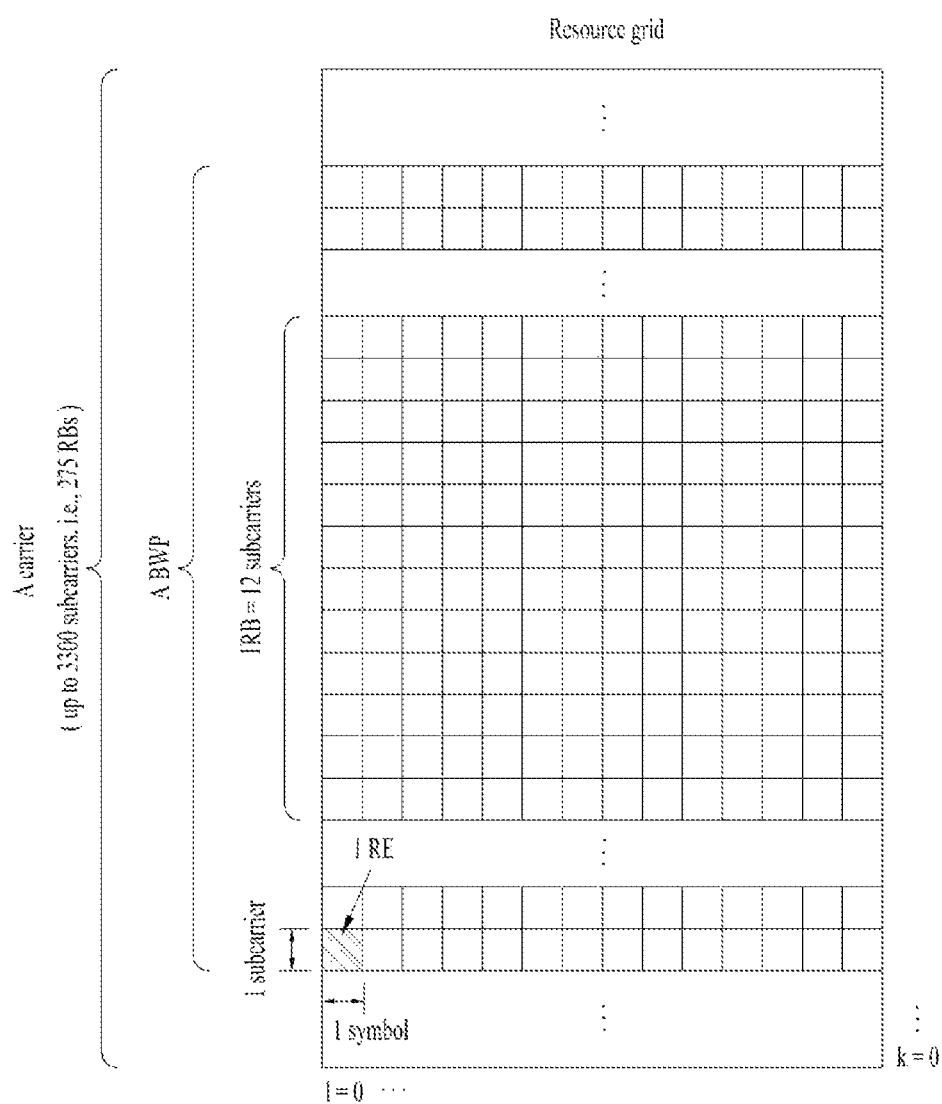
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
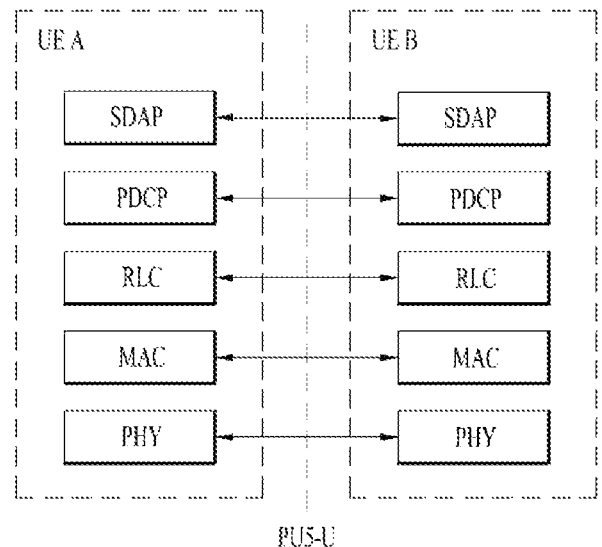
FIG. 6 illustrates a radio protocol architecture for SL communication.
Figure 6:
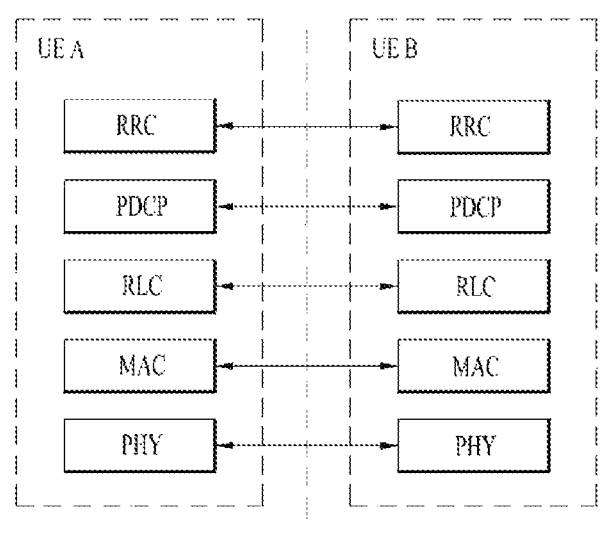

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
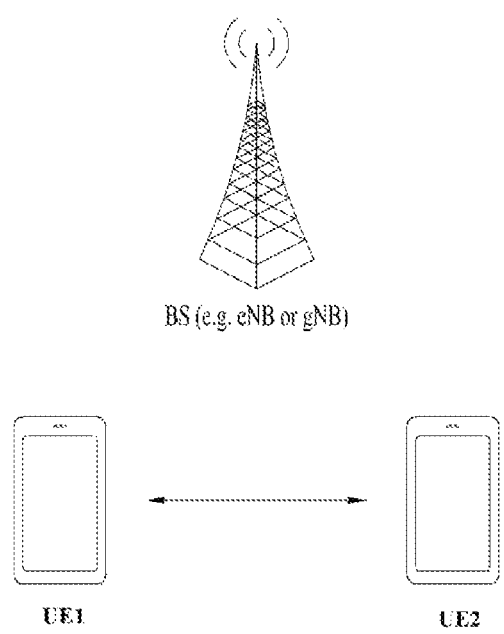
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
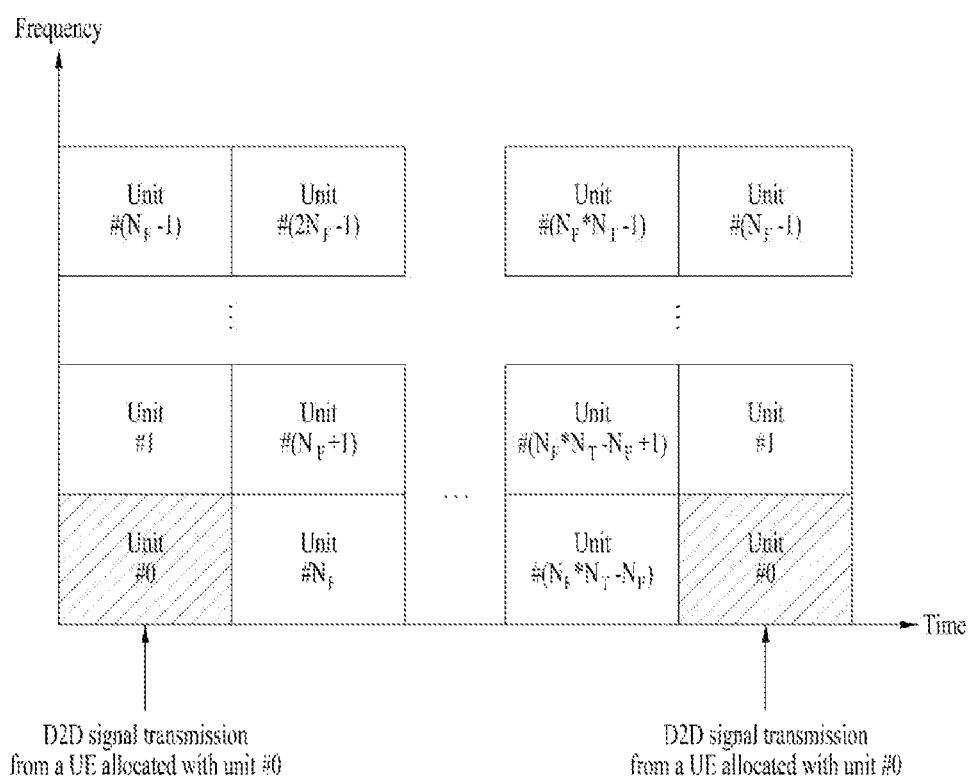
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of $N_T$ subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
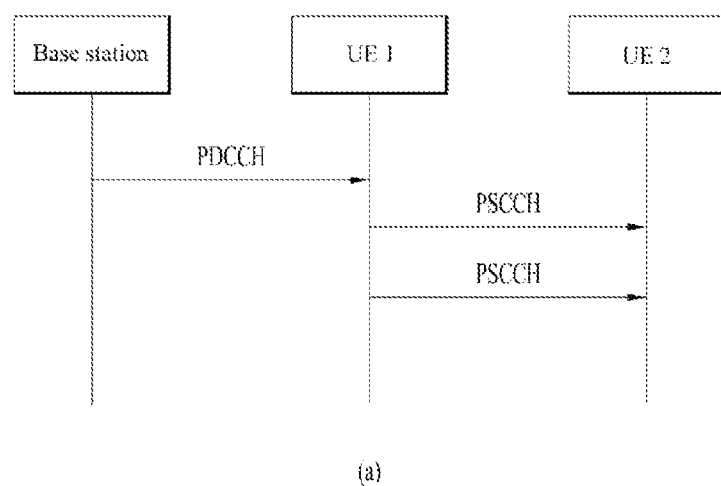
FIG. 9 illustrates a procedure in which UEs perform V2X or SL communication according to a transmission mode.
Figure 9:
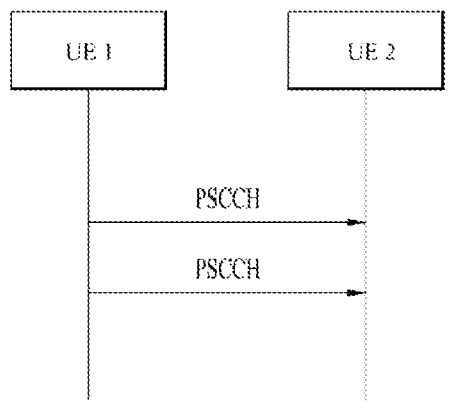

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure.

For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

GPS Position Error Correction Scheme Using Collective Perception Message (CPM)

Figure 10:
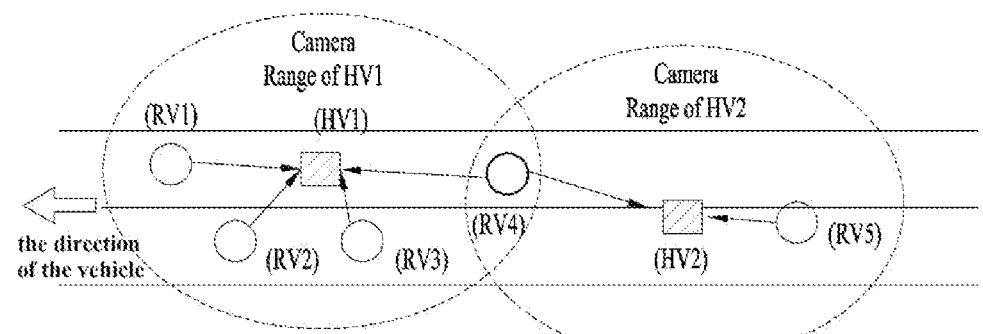
FIG. 10 is a diagram for explaining a method of acquiring object information of a surrounding object from a CPM by a vehicle or a UE included in the vehicle.
Figure 10:
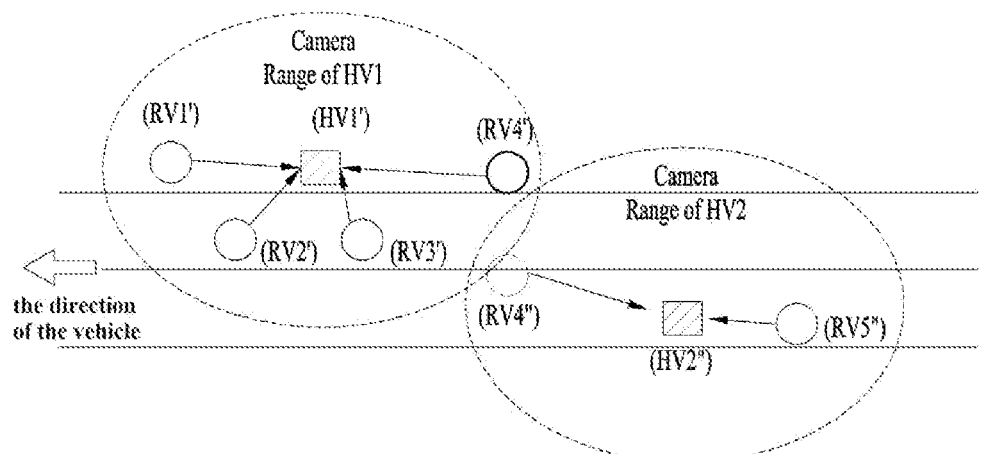

FIG. 10 is a diagram for explaining a method of acquiring object information of a surrounding object from a CPM by a vehicle or a UE included in the vehicle.

In conventional V2X communication, when vehicles inform each other's location or the location of an object, the vehicles may inform the relative state of the object with respect to the vehicle based on a GPS signal.

Referring to FIG. 10(a), when vehicles actually drive, each of a first vehicle HV1 and a second vehicle HV2 may sense a fourth vehicle RV4 and may transmit (or transmit CPM including object information) the object information about the sensed fourth vehicle RV4. In this case, neighbor vehicles that receive the object information may recognize presence of the fourth vehicle RV4 that is an object. In an actual vehicle driving environment, a GPS may not measure an accurate position due to an error, and accordingly, the position of the fourth vehicle based on a relative distance to the fourth vehicle may not be accurate.

In detail, referring to FIG. 10(b), due to the GPS error, the object information of the fourth vehicle RV4 that is sensed and transmitted by the first vehicle HV1 may include the object information of the fourth vehicle RV4 and other position information that are sensed and transmitted by the second vehicle HV2. In other words, a position of the fourth vehicle according to a CPM transmitted by the first vehicle HV1 and a position of the fourth vehicle according to a CPM transmitted by the second vehicle HV2 may not match. For example, a position of RV4' based on object information of the fourth vehicle RV4, transmitted by the first vehicle may be different from a position of RV4" based on object information of the fourth vehicle RV4, transmitted by the second vehicle.

Object information of each vehicle based on a GPS error may not match, and to minimize mismatch, each vehicle needs to correct a GPS error thereof based on object information such as a CPM of another vehicle. In detail, each of the first vehicle HV1 and the second vehicle HV2 that are CPS vehicles with a sensor installed therein needs to compare sensed object information and object information acquired through a CPM or the like and needs to correct a coordinate system thereof to minimize an error of the position or coordinate system thereof while minimizing mismatch between the object information between vehicles.

Figure 11:
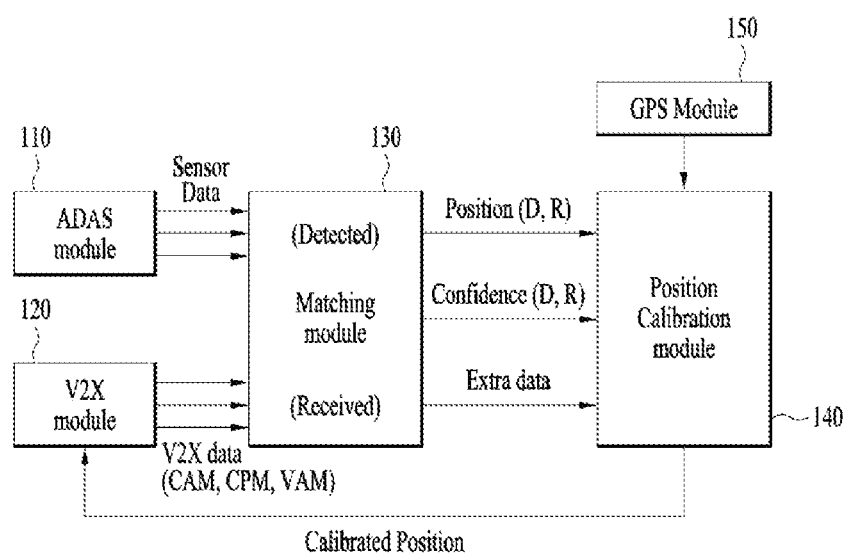
FIG. 11 is a block diagram of a V2X vehicle for correcting a position thereof by matching between received object information and sensed object information.

FIG. 11 is a block diagram of a V2X vehicle for correcting a position thereof by matching between received object information and sensed object information.

Referring to FIG. 11, the V2X vehicle may include an ADAS module 110, a V2X module 120, a matching module 130, a position correction module 140, and a GPS module 150.

In detail, the ADAS module 110 may recognize the position of an object using an ADAS sensor (a camera, a LIDAR, or a radar), and the V2X module 120 may acquire location information of an object from a neighbor vehicle, an ADAS vehicle, or an RSU from a V2X message received from neighbors. The matching module 130 may match an object received from the V2X module and an object detected by the ADAS module 110, and the position correction module 140 may determine and extract an offset based on the matched object information. The GPS module 150 may be a module for acquiring or receive position information of the V2X vehicle based on a signal of a satellite or the like. Here, the position correction module 140 may correct the position of a transmission device of a V2X message received from the V2X module 120 as well as position information of the position correction module 140, acquired from the GPS module 150.

Hereinafter, a method of matching object information received through the V2X module by the matching module 130 and object information measured through an ADAS sensor will be described in detail.

Figure 12:
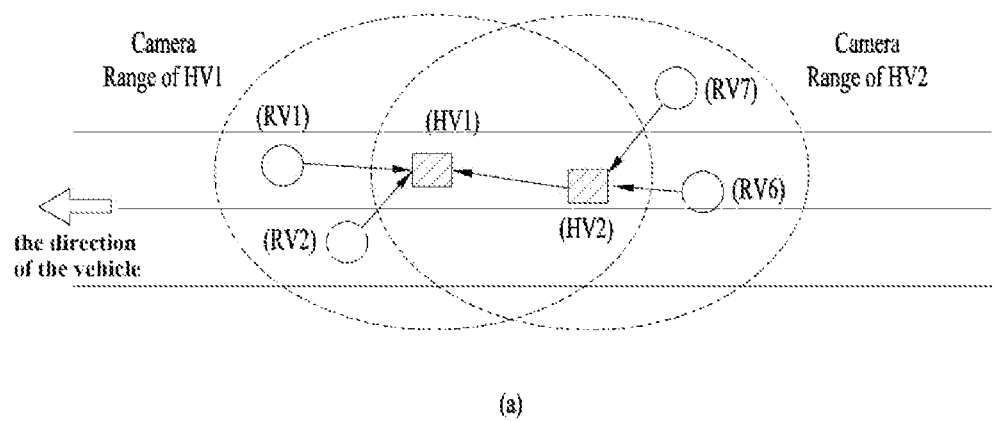
FIGS. 12 and 13 are diagrams for explaining sensed object information and object information as a matching object.
Figure 12:
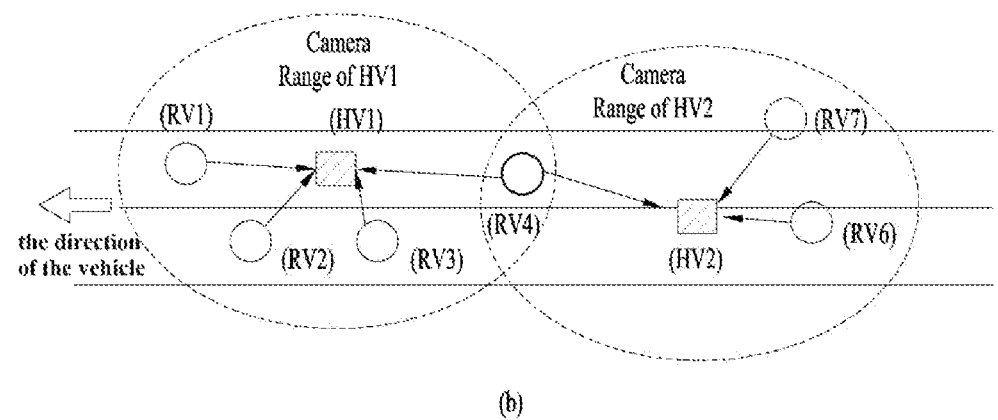
Figure 13:
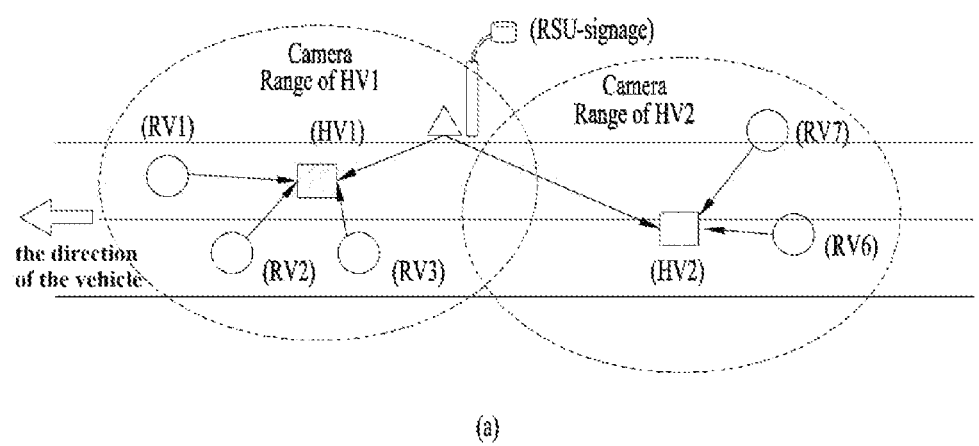
Figure 13:
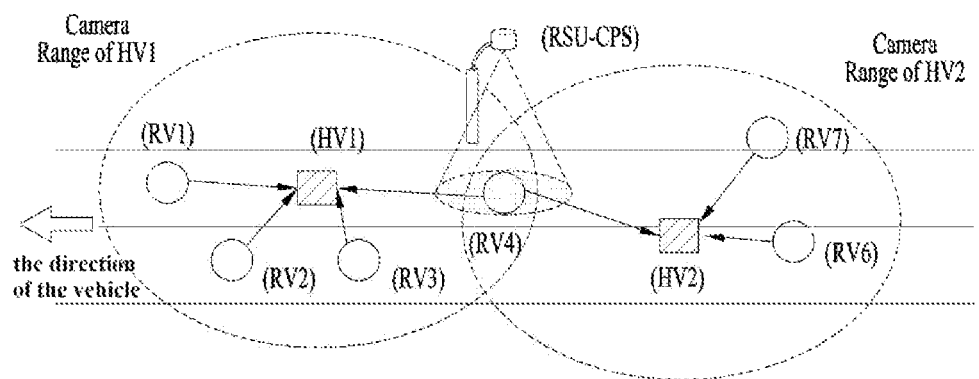

FIGS. 12 and 13 are diagrams for explaining sensed object information and object information as a matching object.

A V2X vehicle or a V2X device may match object information acquired from the V2X module 120 and object information sensed from the ADAS module 110. The matching may be performed by the matching module 130 as described above. In detail, the object information acquired from the V2X module 120 may be various defined as follows. For convenience of description, the object information sensed by the ADAS module 110 or the lie may be defined as first object information, and the object information acquired from the V2X module 120 or the like may be defined as second object information. The first object information and/or the second object information may include the position of an object, the properties of the object, position reliability, or the like.

Referring to FIGS. 12 and 13, the second object information may include ① $(2\text{-}1)^{th}$ object information including position information of a transmission device that transmits a V2X message, ② $(2\text{-}2)^{th}$ object information included in a V2X message received from another device, ③ $(2\text{-}3)^{th}$ object information having a fixed position, and/or ④ $(2\text{-}4)^{th}$ object information acquired from an RSU having a fixed position. A matching method and a location correction method may be changed according to object information, and hereinafter, a method of performing matching between the second object information and the first object information will be described in detail.

Referring to FIG. 12(a), the $(2\text{-}1)^{th}$ object information may be object information about a transmission device, acquired from a V2X message (CAM or CPM) for informing a neighbor device or a neighbor vehicle of a position of the V2X vehicle (①). In this case, the first vehicle HV1 may perform matching for determining whether the $(2\text{-}1)^{th}$ object information and the first object information are object information about the same object.

In detail, the V2X vehicle may acquire the $(2\text{-}1)^{th}$ object information (object information about the transmission device of the V2X message) from the received V2X message. In this case, the V2X vehicle may compare or match the acquired $(2\text{-}1)^{th}$ object information and the first object information sensed through a sensor (an ADAS sensor. For example, the first vehicle HV1 may determine whether the $(2\text{-}1)^{th}$ object information acquired from the received V2X message (CAM or CPM) and the first object information are object information about the same second vehicle HV2 via comparison or matching in order to correct the coordinate system or position of the first vehicle HV1.

For example, both of the first vehicle HV1 and the second vehicle HV2 are capable of providing a CPS service, each of the first vehicle HV1 and the second vehicle HV2 may transmit the CAM and/or the CPM (or a V2X message) for informing the position thereof, as shown in FIG. 12(a). In this case, the first vehicle HV1 may acquire the $(2\text{-}1)^{th}$ object information from the received CAM and/or CPM. In this case, the first vehicle HV1 may match the acquired $(2\text{-}1)^{th}$ object information and the first object information sensed through the sensor. In detail, when a position based on the first object information is less than a preconfigured threshold from a position based on the $(2\text{-}1)^{th}$ object information, the first vehicle HV1 may match first object information and the $(2\text{-}1)^{th}$ object information or may determine whether the first object information and the $(2\text{-}1)^{th}$ object information are object information about the same object.

Although described below in detail, the first vehicle HV1 may correct the position thereof based on the matching result. In detail, the position or coordinate system of the first vehicle HV1 may be corrected by determining an offset based on the first object information and the $(2\text{-}1)^{th}$ object information and applying the determined offset to the coordinate system or the position of the first vehicle HV1. Here, even if a position of each of the first vehicle HV1 and the second vehicle HV2 is initially corrected by an error of an GPS, the error may be large, but position information of each of the first vehicle HV1 and the second vehicle HV2 with a minimized error may be lastly acquired and mismatch between object information included in each CPM may be minimized through a continuous algorithm operation and the aforementioned position correction with a plurality of neighbor vehicles.

Referring to FIG. 12(b), the $(2\text{-}2)^{th}$ object information may be object information acquired from the received V2X message, and in detail, may be object information about a neighbor device or a neighbor vehicle, acquired through a sensor or the like by a transmission device that transmits the V2X message (②). For example, the $(2\text{-}2)^{th}$ object information may be object information about an object, sensed by the transmission device of the V2X message, and may be different from the $(2\text{-}1)^{th}$ object information that is object information about the transmission device of the V2X message.

Alternatively, the first vehicle HV1 and the second vehicle HV2 may sense a specific vehicle through a sensor and may transmit a V2X message including the $(2\text{-}2)^{th}$ object information including information about the properties of the special vehicle. The first vehicle HV1 may perform matching first object information about the special vehicle and second object information second object information about the specific vehicle, included in the V2X message. In detail, the first vehicle HV1 may acquire the properties (a specific vehicle type or a specific color) of the object from the $(2\text{-}2)^{th}$ object information and may match the first object information and the $(2\text{-}2)^{th}$ object information by determining whether the first object information about an object corresponding to the acquired properties of the object is present.

For example, each of the first vehicle HV1 and the second vehicle HV2 may acquire sensing information such as a relative position with respect to the fourth vehicle RV4 through a sensor. The first vehicle HV1 and the second vehicle HV2 may transmit and receive a V2X message including sensing information of the first vehicle HV1 and the second vehicle HV2. In this case, the first vehicle HV1 may match the first object information and the $(2\text{-}2)^{th}$ object information by determining whether the first object information having vehicle properties corresponding to vehicle properties of the $(2\text{-}2)^{th}$ object information, included in the received V2X message, is present.

Referring to FIG. 13(a), the $(2\text{-}3)^{th}$ object information may be information predefined for an RSU having a fixed position and/or a road fixture (a sign or a signal) or object information about the RSU and/or the road fixture provided from the RSU (③). The first vehicle HV1 may perform matching for determining whether the $(2\text{-}3)^{th}$ object information and the first object information are object information for the same object. When the first object information and the $(2\text{-}3)^{th}$ object information are matched, the first vehicle HV1 may correct the position thereof based on an object position based on the $(2\text{-}3)^{th}$ object information.

For example, when the RSU and/or the road fixture are sensed, the first vehicle HV1 may attempt to perform matching to determine whether the pre-stored $(2\text{-}3)^{th}$ object information corresponding to the sensed RSU and/or road fixture is present.

Referring to FIG. 13(b), the $(2\text{-}4)^{th}$ object information may be object information provided from the RSU having a fixed position and may be object information about a special vehicle, sensed by the RSU (④). In this case, the first vehicle HV1 may determine or match whether the $(2\text{-}4)^{th}$ object information received from the RSU and the first object information are object information about the same object (or a special vehicle). When the first object information and the $(2\text{-}4)^{th}$ object information are matched, the first vehicle HV1 may correct the position thereof based on an object position based on the $(2\text{-}4)^{th}$ object information.

For example, an RSU may provide position information of a special vehicle to the first vehicle HV1 or the second vehicle HV2 (or a neighbor ADAS vehicle) using a camera installed in the RSU. In this case, the first vehicle HV1 may match the $(2\text{-}4)^{th}$ object information acquired from the RSU and the first object information. Alternatively, the first vehicle HV1 may perform matching between the $(2\text{-}4)^{th}$ object information and the first object information by determining whether first object information about a vehicle having properties corresponding information about the properties of the special vehicle, included in the $(2\text{-}4)^{th}$ object information, are present.

Figure 14:
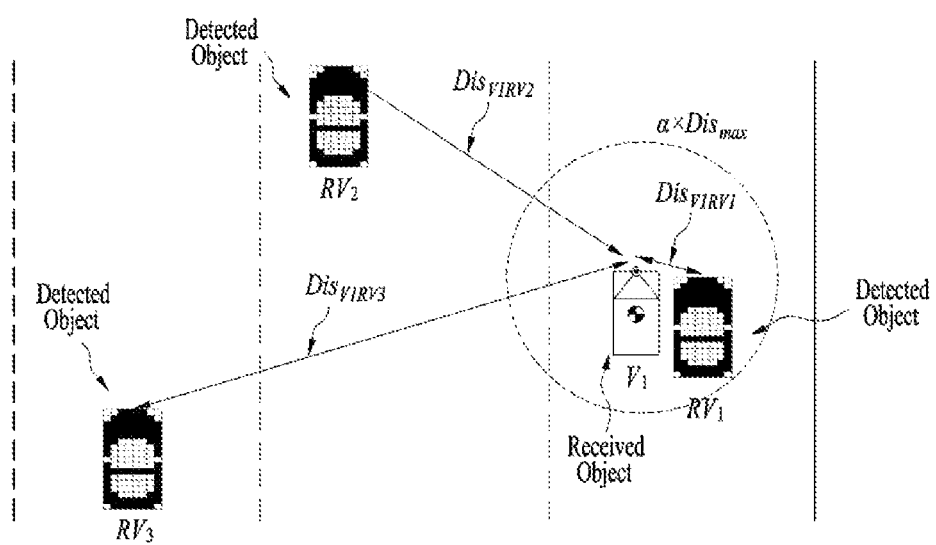
FIGS. 14 and 15 are diagrams for explaining a method of matching between the first object information and the second object information.
Figure 15:
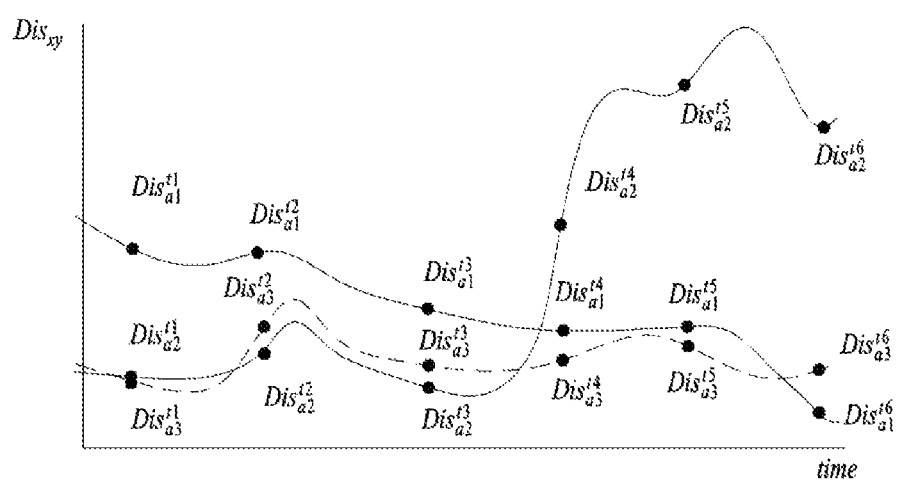

FIGS. 14 and 15 are diagrams for explaining a method of matching between the first object information and the second object information.

Referring to FIG. 14, the V2X vehicle may acquire the $(2\text{-}4)^{th}$ object information described with reference to FIG. 13(b) as the object information acquired by the RSU.

In detail, the V2X vehicle may sense first to third sensing objects RV1, RV2, and RV3 as the first object information and may acquire the $(2\text{-}4)^{th}$ object information about an object V1 acquired from the RSU.

In this case, the V2X vehicle may calculate a value of Dis as a distance between the first object information and the $(2\text{-}4)^{th}$ object information. For example, the first vehicle may match first object information of each of a plurality of vehicles RV1, RV2, and RV3 and the $(2\text{-}4)^{th}$ object information about the object V1 detected by the RSU. In detail, the V2X vehicle may calculate distances $\text{Dis}_{V1,RV1}$, $\text{Dis}_{V1,RV2}$, and $\text{Dis}_{V1,RV3}$ between each of the plurality of vehicles RV1, RV2, and RV3 and the object V1 based on the $(2\text{-}4)^{th}$ object information and may list the calculated distances in ascending order (or descending order). The V2X vehicle may select a shortest distance $\text{Dis}_{V1,RV1}$ among the calculated distance and may compare the selected shortest distance and a preconfigured threshold Tdis calculated from Equation 1 below. When the selected shortest distance is equal to or greater than the specific threshold, the V2X vehicle may determine that first object information about the first sensing object RV1 is matched with the $(2\text{-}4)^{th}$ object information (V1).

$$T_{dis} = \alpha \times \text{Dis}_{max} \qquad \text{[Equation 1]}$$

Here, the preconfigured threshold may be calculated based on the reliability of a sensor device (or a camera). In detail, the preconfigured threshold may be determined or preconfigured by applying a weight α based on the reliability of a GPS to a predetermined value $\text{Dis}_{max}$ corresponding to the reliability of the sensor device. For example, the $\text{Dis}_{max}$ may be an error distance range to be predicted according to the reliability of the sensor device, and a may be a value for applying a rate of change of the error distance range based on the reliability of the GPS.

Then, the V2X device may calculate a minimum $\text{Dis}_{V1RV1}$ value and a next smaller $\text{Dis}_{V1RV2}$ value based on Equation 2 below. When it is smaller than a ratio of a specific weight β, object matching may be lastly performed.

$$\text{if } \beta \times \text{Dis}_{V1RV1} > \text{Dis}_{V1RV2} \qquad \text{[Equation 2]}$$

Alternatively, the aforementioned matching algorithm may be used to match objects by comparing corresponding values in time as well as using a measurement method in real time.

FIG. 15 illustrates a value of Dis for each hour. 'a' in the value of Dis may refer to an object acquired through receive V2X, and 1, 2, and 3 in the value of Dis may refer to objects measured through an ADAS sensor. That is, as shown in a drawing below, even if $Dis_{a1}^{t6}$ at a time T6 has a lowest value, $Dis_{a2}^{t6}$ having a lowest value at a previous time may be selected.

For an operation therefor, as in Equation 3, the value of Dis may be configured in a direction of accumulating previous values using a weight a. That is, objects may be matched via comparison of $AVR\_Dis_{ab}^{t}$.

$$AVR\_Dis_{ab}^{t}=\alpha Dis_{ab}^{t}+(1-\alpha)AVR\_Dis_{ab}^{t-1} \quad \text{[Equation 3]}$$

As described above, after matching between the first object information and the second object information is performed, when the first object information and the second object information include object information about the same object, the position correction module 140 described with reference to FIG. 11 may correct the position thereof based on the matching result. Hereinafter, a method of determining an offset for correcting the position thereof based on the matching result by a V2X device will be described in detail.

Figure 16:
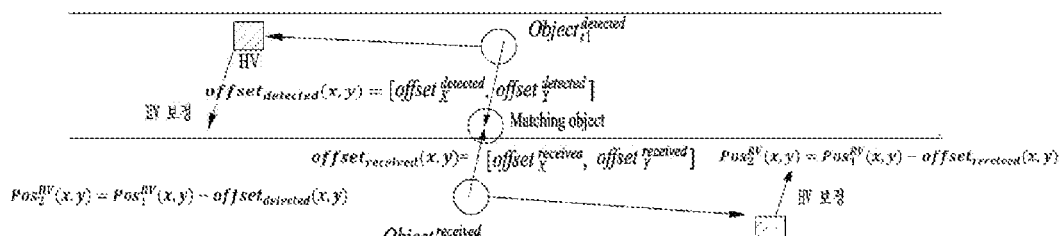
FIG. 16 is a diagram for explaining a method of determining an offset for position correction based on a matching result.
Figure 16:
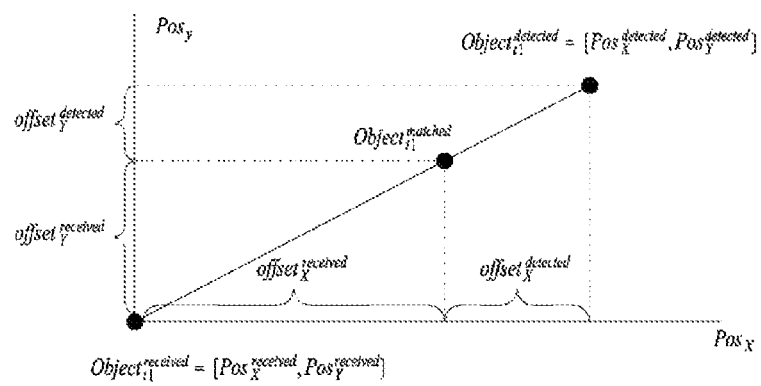

FIG. 16 is a diagram for explaining a method of determining an offset for position correction based on a matching result.

Referring to FIG. 16(*a*), with regard to a first V2X vehicle HV and a second V2X vehicle RV, there may be an error in object information for the same object due to a GPS error and/or a sensor error. For example, as shown in FIG. 16(*a*), even if the first V2X vehicle HV and the second V2X vehicle RV sense the same object, a specific object position $Object_{t1}^{detected}$ sensed in the first V2X vehicle HV may be different from a specific object position $Object_{t1}^{received}$ sensed in the second V2X vehicle RV.

In this case, the first V2X vehicle HV may calculate or determine an Offset1 and/or an Offset2 based on a spacing distance between the specific object position based on the sensed first object information and the specific object position based on the second object information acquired from a V2X message of the second V2X vehicle RV, first GPS reliability and first number of corrections of the first V2X vehicle HV, and a second number of corrections and second GPS reliability included in the second object information. Here, the first GPS reliability may be the reliability (or reliability for a sensor is further applied) of position information acquired through a satellite signal in the first V2X vehicle HV, the second position reliability may be the reliability (or reliability for a sensor is further applied) of position information acquired through a satellite signal in the second V2X vehicle RV, the first number of corrections may be a position number of corrections in the first V2X vehicle HV based on the second object information, and the second number of corrections may be a position number of corrections in the second V2X vehicle RV based on the second object information.

In detail, the first V2X vehicle HV may acquire the first object information about the specific object that is the same object as the second object information through a sensor device or the like. The first V2X vehicle HV may determine an offset based on the first GPS reliability and the first number of corrections that are related to the first object information, and the second GPS reliability and the second number of corrections that are related to the second object information. The first V2X vehicle HV may move the position of the specific object based on the first object information to specific coordinates (a matching object position of FIG. 16) by applying the determined offset. As described above, the offset may be determined or calculated based on the spacing distance, the first GPS reliability, the first number of corrections, the second GPS reliability, and the second number of corrections.

Referring to FIG. 16(*b*), the first V2X vehicle may correct a position thereof through the offset determined based on information of two matched objects.

First, position reliability values $conf_{detected}$ and $conf_{received}$ may be calculated based on the GPS reliability information of the two matched devices. According to Equation 4 below, the position reliability may be calculated based on the first GPS reliability, the first number of corrections, the second GPS reliability, and the second number of corrections. In detail, the first position reliability $conf_{detected}$ may be calculated as the sum of a value obtained by applying a first weight $\alpha$ to the first GPS reliability and a value obtained by applying a second weight $\beta$ to the first number of corrections, and the second position reliability $conf_{received}$ may be calculated as the sum of a value obtained by applying the first weight $\alpha$ to the second GPS reliability and a value obtained by applying the second weight $\beta$ to the second number of corrections. The second position reliability may also be acquired through the V2X message including the second object information.

$$conf_{received}=\alpha^{*}conf_{received}^{GPS}+\beta^{*}N_{received}^{correction}$$

$$conf_{detected}=\alpha^{*}conf_{detected}^{GPS}+\beta^{*}N_{detected}^{correction} \quad \text{[Equation 4]}$$

Here, $conf_{received}^{GPS}$ is the above-described first GPS reliability, $conf_{detected}^{GPS}$ is the above-described second GPS reliability, $N_{received}^{correction}$ is the above-described first number of corrections, and $N_{detected}^{correction}$ is the above-described second number of corrections.

The first weight and the second weight may be preconfigured based on road conditions or surrounding conditions. For example, when a vehicle drives through the city building forest or the weather is bad, the first GPS reliability (or GPS reliability) may change significantly. In this case, the second weight may be preconfigured to be higher than the first weight, and thus a ratio in which the first number of corrections is applied to the first position reliability may be greater than the first GPS reliability. In contrast, when a surrounding environment is good (or when a GPS measurement environment is good), the first weight may be preconfigured to be higher than the second weight. In other words, a rate of change in the GPS reliability increases, the first weight may be lowered and the second weight may be increased, and as the rate of change of the GPS reliability decreases, the first weight may be increased and the second weight may be lowered.

Then, the Offset1 and the Offset2 may be calculated or determined based on Equations 5 and 6 below.

$$offset_{detected}(x, y) = \frac{conf_{detected}}{conf_{received} + conf_{detected}} * Y(x, y) \quad \text{[Equation 5]}$$

$$offset_{received}(x, y) = \frac{conf_{received}}{conf_{received} + conf_{detected}} * Y(x, y)$$

$$Y(x, y) = \left(Pos_x^{detected} - Pos_x^{received}, Pos_y^{detected} - Pos_y^{received}\right)$$

Here, $Offset_{detected}(x,y)$ is the Offset1, $Offset_{received}(x,y)$ is the Offset2, $Pos_x^{detected}$ and $Pos_y^{detected}$ are object positions based on the first object information, $Pos_x^{received}$ and $Pos_y^{received}$ are object positions based on the second object information, and Y(x, y) is the spacing distance (a distance between an object position based on the first object information and an object position based on the second object information).

The first V2X vehicle HV or the second V2X vehicle RV may correct the position thereof by applying the Offset1 and the Offset2 based on Equation 6 below.

$$Pos_2^{HV}(x,y) = Pos_1^{HV}(x,y) - \text{offset}_{detected}(x,y)$$

$$Pos_2^{RV}(x,y) = Pos_1^{PV}(x,y) - \text{offset}_{received}(x,y) \quad \text{[Equation 6]}$$

Here, $Pos_1^{HV}(x, y)$ is a position (before correction) of the first V2X vehicle HV, and $Pos_1^{RV}(x, y)$ is a position (before correction) of the second V2X vehicle RV.

The second position reliability may be configured differently depending on a type of the second object information. In detail, in the case of the $(2-3)^{th}$ object information described with reference to FIG. 13(a), when the RSU and a road sign are sensed through a sensing device and pre-stored second object information matched with the first object information as the sensed information is present, the first vehicle HV1 and the second vehicle HV2 may correct a position or coordinate information thereof based on the second object information. That is, when the second object information matched with the first object information is present, the first vehicle HV1 may determine an offset for moving a position based on the first object information to a position based on the $(2-3)^{th}$ object information irrespective of the position reliability and may apply the determined offset to the position or coordinate system thereof.

The position reliability of the $(2-4)^{th}$ object information described with reference to FIG. 13(b) may be preconfigured to have a high value, and an offset for correcting the coordinate system or the position of the vehicle may be determined based on the reliability. For example, the second position reliability of the second object information may be preconfigured as a high value to neglect the first position reliability, and in this case, the offset may be determined as a value corresponding to the spacing distance.

Figure 17:
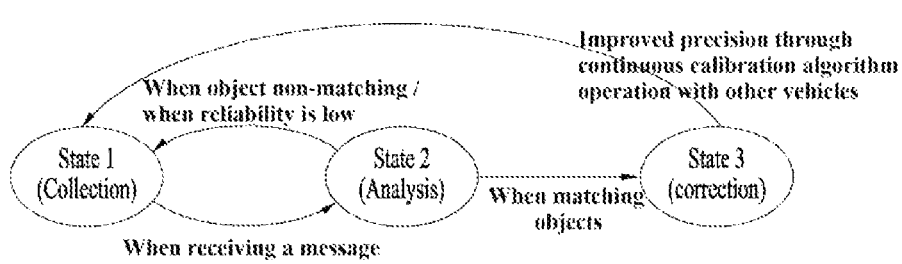
FIG. 17 is a diagram for explaining a method of transmitting a CPM by a V2X device.

FIG. 17 is a diagram for explaining a method of transmitting a CPM by a V2X device.

Referring to FIG. 17, the V2X device may transmit the CPM based on State1, State2, and State3.

In detail, the V2X device may perform an operation (or an operation of transmitting a generated V2X message) of generating a V2X message such as a CPM by detecting a surrounding object using a sensor and determining a position of each surrounding object using a GPS of the V2X device as a basic CPS operation in the State1. When receiving V2X messages CAM, CPS, and VAM from neighbors before transmitting the message, the V2X device may further perform an operation of the State2.

In State 2, the V2X device may perform an operation of matching an object using a matching algorithm. Here, object matching may be a procedure of determining whether the first object information and the second object information described with reference to FIGS. 12 and 13 are object information about the same object. When two objects received through an ADAS sensor and a V2X message are matched (or when the first object information and the second object information are determined to be object information about the same object), the V2X device may proceed to State3 that is a correction step. In contrast, when the first object information and the second object information are not matched, the V2X device may return to State1 to perform a conventional collection operation. Even if the first object information and the second object information are matched, when the reliability of the second object information is equal to or less than a specific level, the V2X device may transmit the V2X message generated based on State 1 rather than performing the correction operation based on State3.

The V2X device may correct the position or coordinate system thereof based on the first object information and the second object information that are matched in the State3. In detail, the V2X device may determine the offset based on the first object information, the second object information, first position reliability related to the first object information, and second position reliability related to the second object information, and may update or correct the position thereof based on the determined offset. When correction is completed, the V2X device may return to the State1 to generate a CPS message based on the corrected position thereof and may transmit the CPS message to neighbors.

Figure 18:
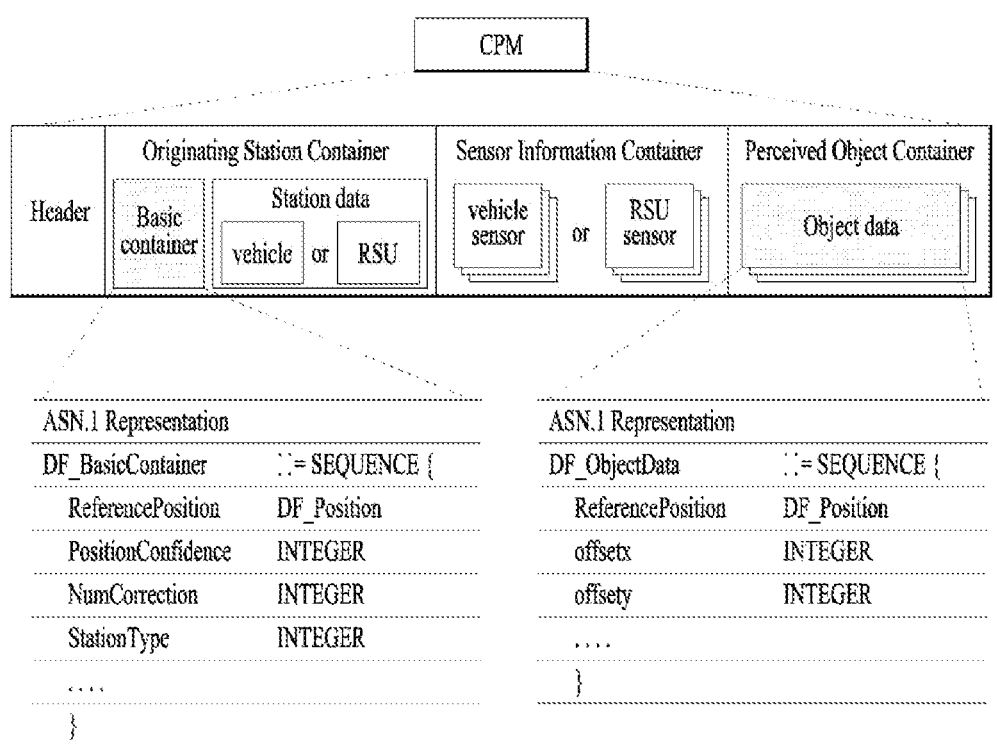
FIG. 18 is a diagram for explaining the configuration of a new CPS message or CPM.

FIG. 18 is a diagram for explaining the configuration of a new CPS message or CPM.

Referring to FIG. 18, for correction of a GPS using the CPS, 'PositionConfidnece', and 'NumCorrection' may be added to a Basic Container of the CPM. A data element of each of the 'PositionConfidnece' and the 'NumCorrection' may be declared as an integer. The 'PositionConfidence' is a value for indexing GPS performance of a corresponding device, and as the value increases, reliability is increased. The 'NumCorrection' may be a count of the number of corrections. That is, as the position is corrected more times according to the above-described method (or algorithm), the device may have a higher value. The position correction module 140 may calculate the above-described corrected reliability and offset using a corresponding value.

The corrected position information of an object may be transferred to a corresponding vehicle to help correction in the correction in the corresponding vehicle. To this end, the CPM obtained by adding the calculated offset to an object data frame corresponding to the Object Container may be transmitted to correct the position of the corresponding device. The corresponding device may correct the position thereof based on the offset included in the CPM, and other RVs may also recognize the corresponding device by applying the corresponding offset.

Figure 19:
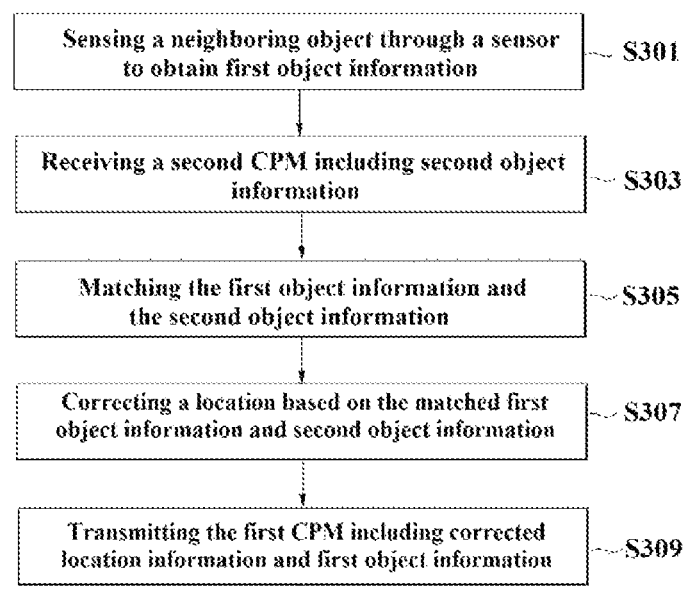
FIG. 19 is a diagram for explaining a method of transmitting a first CPM including position information corrected based on the second CPM received by a UE.

FIG. 19 is a diagram for explaining a method of transmitting a first CPM including position information corrected based on the second CPM received by a UE.

Referring to FIG. 19, the UE may sense neighbor vehicles through a sensor and may first object information that is object information about each of the neighbor vehicles based on the sensing result (S301). The first object information may include the position of the neighbor vehicle, a relative distance with the neighbor vehicle, and the properties of the neighbor vehicle. The UE may transmit the first CPM including the sensed first object information and the position information of the UE to inform the neighbor vehicles of information about the position of the UE and the detected neighbor vehicles.

Then, the UE may receive a second CPM including the second object information from another UE or a neighbor V2X vehicle (S303). The second CPM may include second object information that is information about an object detected by the neighbor V2X vehicle through a sensor and/or position information about a second UE that is a UE for transmitting the second CPM, like the first CPM. The UE may acquire at least one second object information about each of the at least one object based on the received second CPM.

The second object information may include the $(2-1)^{th}$ object information, the $(2-2)^{th}$ object information, the $(2-3)^{th}$ object information, and/or the (2-4)$^{th}$ object information that are described with reference to FIGS. 12 and 13. Here, the second object information may be information about at least one object detected by the second UE or object information about the second UE, and in detail, the second object information may include information about a position of an object, a relative distance with the object, the appearance characteristics of the object, ID information of the object, and/or position reliability (or GPS reliability and a number of corrections) of the second object information. The second CPM may include multiple second object information.

The first object information may include information on a relative distance with an object sensed based on the position of the UE, and the position of the sensed object may be determined by applying the relative distance to the position of the UE. Similarly, the second object information may include information about a relative distance with the object corresponding to the second object information based on the position of a UE (hereinafter, the second UE) that transmits the second CPM, and the position of the object corresponding to the second object information may be determined by applying the relative distance to the position of the second UE. In other words, the first object information and the second object information may include information about a relative object position related to the surrounding object based on the position of the specific UE.

Then, the UE may perform matching between the first object information and the second object information (S305). Here, matching may be performed to determine whether an object corresponding to the first object information is the same object as an object corresponding to the second object information, and may be a step for determining whether the first object information and the second object information are object information about the same object.

In detail, the UE may determine whether an object position (second object position) included in the second object information is within a preconfigured threshold distance with an object position (a first object position) included in the first object information. Here, the preconfigured threshold may be preconfigured based on Equation 1 above. For example, the UE may determine the preconfigured threshold by applying a weight corresponding to the GPS reliability of the UE to a predetermined value preconfigured based on the reliability of a sensing device of the UE. In other words, an error range (or the maximum error range) that may occur during measurement of a relative distance with an object position to be allowable based on the accuracy of a sensor may be specified (i.e., the predetermined value is specified), and a weight in consideration of a range in which the error range is to be changed depending on a GPS error may be determined based on the GPS reliability.

The UE may further determine whether the first object information and the second object information are matched through comparison based on Equation 2 above (i.e., a procedure of determining whether the first object information and the second object information are object information about the same object) and may determine whether the first object information and the second object information are matched by applying a time flow based on Equation 3 above.

The UE may sense multiple first object information, may compare the multiple first object information with multiple second object information, respectively, when acquiring the multiple second object information from the second CPM, and may determine whether the matched first object information and second object information having a distance less than the preconfigured threshold are present.

Then, the UE may correct a position thereof based on the matched first object information and second object information (S307). In detail, the UE may calculate first position reliability related to the first object information based on the Equation 4 above. When the second CPM includes information about the GPS reliability and number of corrections, the UE may calculate second position reliability related to the second object information based on Equation 4 above. The UE may calculate a ratio between the first position reliability and the second position reliability and may calculate a spacing distance between a position based on the first object information and a position based on the second object information. The UE may calculate or determine the Offset1 for correcting the position of the UE based on the calculated ratio and the spacing distance.

For example, the UE may calculate the ratio by dividing the first position reliability by the sum of the first position reliability and the second position reliability based on Equation 5 above and may determine the Offset1 related to the position of the UE by multiplying the calculated spacing distance by the ratio. In addition, the UE may calculate the ratio by dividing the second position reliability by the sum of the first position reliability and the second position reliability based on Equation 5 above and may determine or calculate the Offset2 for the second UE by multiplying the calculated spacing distance by the ratio.

In this case, the UE may correct the position thereof by applying the Offset1 determined based on Equation 6 above to the position of the UE. In detail, the UE may apply the Offset1 determined to reduce a difference between the position based on the second object information and the position based on the first object information as shown in FIG. 16. The UE may increase the first number of corrections by 1 when correcting the position of the UE by applying the Offset1. In addition, the UE may correct the position of the second UE by applying the Offset2 determined based on Equation 6 above to the position of the second UE that transmits the second CPM.

When the second object information is transmitted by an RSU having a fixed position, the second position reliability may be preconfigured. For example, the second position reliability may be preconfigured as a significantly high value compared with the first position reliability. In this case, the Offset1 determined based on Equation 6 above may be determined as a value corresponding to the spacing distance. That is, when the second object information is transmitted by an RSU, the Offset1 may be determined or calculated as a value for moving the position based on the first object information to the position based on the second object information. For example, when the second object information is transmitted by the RSU, the Offset1 may be determined or calculated as a value for matching the position of the first object information with the position based on the second object information.

In addition, when there are multiple matched first object information and second object information (i.e., when there are multiple matched object information among the multiple first object information and the multiple second object information), the UE may determine the Offset1 based on the first object information closest to the UE among the multiple matched object information and the second object information matched therewith.

In addition, when the second position reliability is less than preconfigured threshold reliability, even if the first object information and the second object information are matched, the UE may not correct the position thereof. In this case, the UE may transmit the first CPM including the position information and the first object information that are acquired from the GPS without the above-described correction of the position of the UE.

Then, the UE may transmit the first CPM including the position information of the UE and the first object information, which are corrected by correcting the Offset1, to neighbor UEs (S309). As the position information of the UE is corrected, the position of the first object information included in the first CPM may also be dependently corrected. For example, the first CPM may include information about the position of the UE and a relative distance with an object corresponding to the first object information, and a UE that receives the first CPM may identify the position of the object corresponding to the first object information by applying the relative distance to the position of the UE.

The first CPM may further include information about the Offset2. In this case, the second UE may correct the position thereof based on the Offset2 included in the first CPM.

In this method, the first UE may minimize mismatch of object information due to a GPS error with the second UE and may effectively perform a position-based V2X service such as autonomous driving by minimizing mismatch of the object information.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
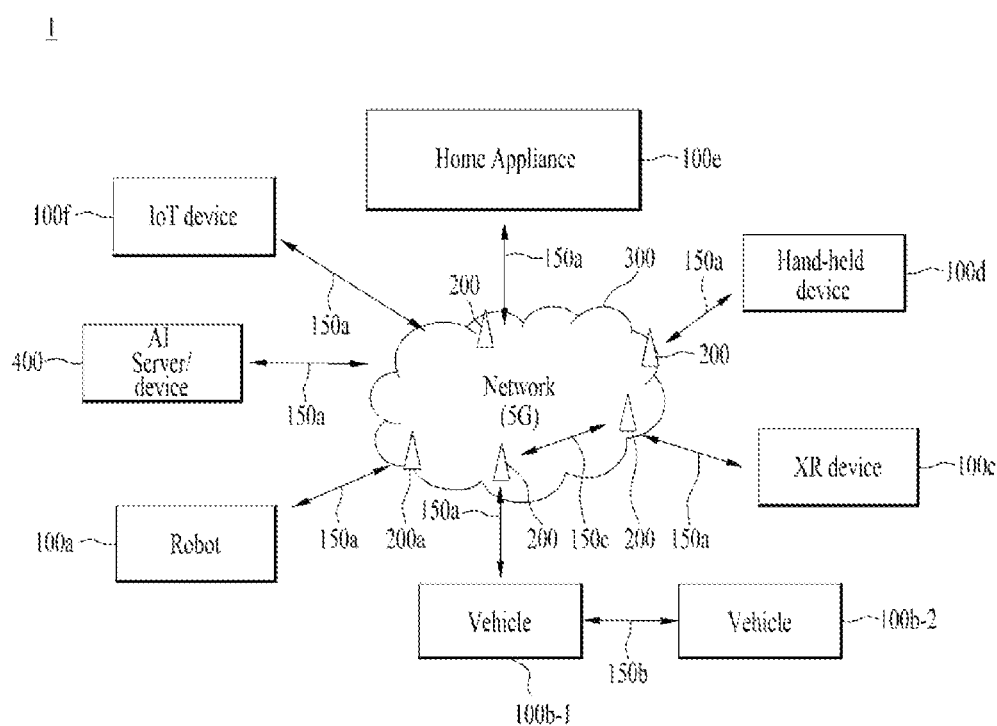
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
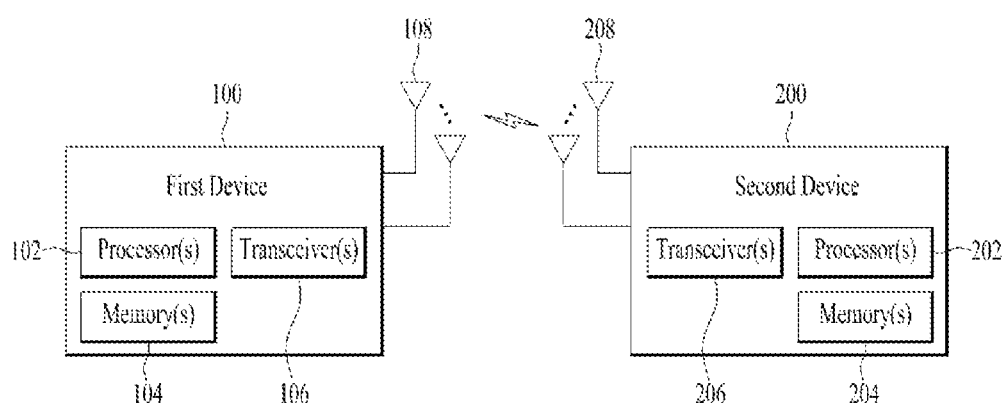
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE may include the processor 102 and the memory 104 that are connected to the RF transceiver. The memory 104 may contain at least one program for executing an operation related to the embodiments described with reference to FIGS. 10 to 19. Here, the RF transceiver may include a plurality of distributed antennas.

The processor 102 may acquire first object information about a surrounding object through a sensor and may control RF transceiver to receive a second CPM including second object information and to transmit the first CPM including the first object information and position information of the UE, the second CPM may further include information about position reliability of the second object information, the position information of the UE may be corrected by applying an offset when the first object information and the second object information are determined to be object information about the same object, and the offset may be determined by applying a ratio between the first position reliability related to the position information of the UE and the second position reliability included in the second CPM to a distance between an object position based on the first object information and an object position based on the second object information. The processor 102 may perform operations of correcting a position and transmitting a CPM including information about the corrected position based on the program contained in the memory 104 according to the embodiments described with reference to FIGS. 10 to 19.

A chip set including the processor 102 and the memory 104 may be configured. In this case, the chip set may include at least one processor and at least one memory operatively connected to the at least one processor and configured to cause the at least one processor to perform an operation when executed, and in this case, the operation may include acquiring first object information about a surrounding object through a sensor, receiving a second CPM including second object information, and transmitting the first CPM including the first object information and position information of the UE, the second CPM may further include information about position reliability of the second object information, the position information of the UE may be corrected by applying an offset when the first object information and the second object information are determined to be object information about the same object, and the offset may be determined by applying a ratio between the first position reliability related to the position information of the UE and the second position reliability included in the second CPM to a distance between an object position based on the first object information and an object position based on the second object information. The operation may include performing operations of correcting a position and transmitting a CPM including information about the corrected position based on the program contained in the memory 104 according to the embodiments described with reference to FIGS. 10 to 19.

A computer readable storage medium containing at least one computer program for causing the at least one processor to perform an operation may be provided, the operation may include acquiring first object information about a surrounding object through a sensor, receiving a second CPM including second object information, and transmitting the first CPM including the first object information and position information of the UE, the second CPM may further include information about position reliability of the second object information, the position information of the UE may be corrected by applying an offset when the first object information and the second object information are determined to be object information about the same object, and the offset may be determined by applying a ratio between the first position reliability related to the position information of the UE and the second position reliability included in the second CPM to a distance between an object position based on the first object information and an object position based on the second object information. The operation may include performing operations of correcting a position and transmitting a CPM including information about the corrected position based on the program contained in the memory 104 according to the embodiments described with reference to FIGS. 10 to 19.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
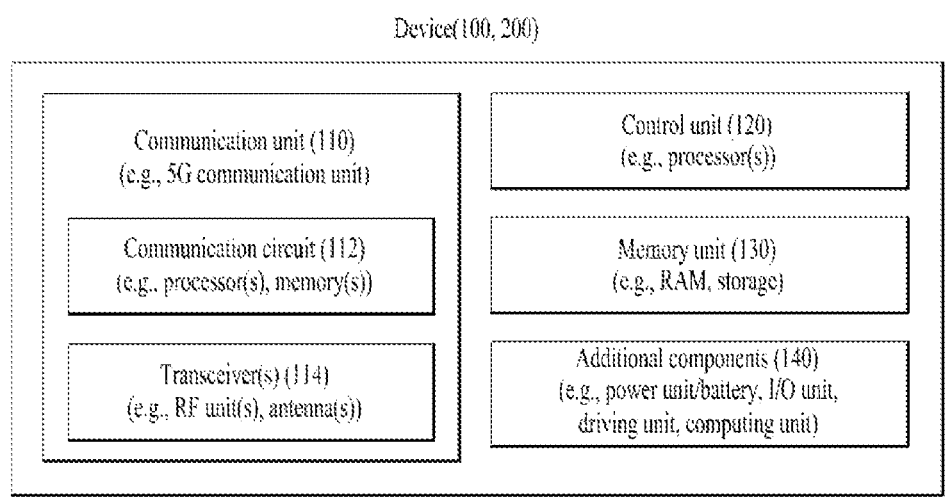
FIG. 22 illustrates another example of a wireless device to which the present disclosure is applied.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
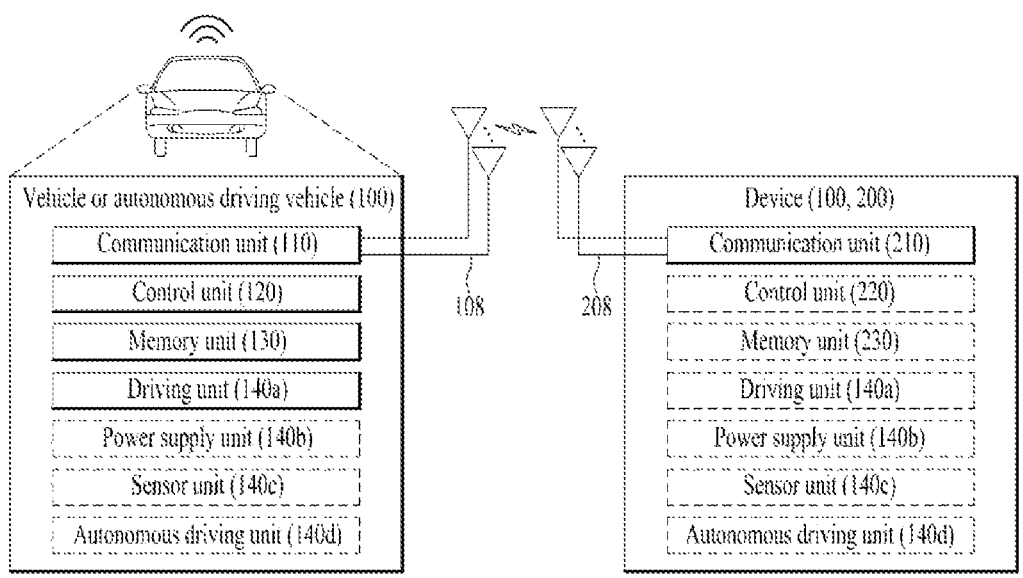
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL AVAILABILITY

The above-described embodiments of the present disclosure are applicable to various mobile communication systems.

The invention claimed is:

1. A method of transmitting a first collective perception message (CPM) by a user equipment (UE) in a wireless communication system, the method comprising:
acquiring first object information on a first object through a sensor;
receiving a second CPM including second object information including a second position of a second object; and
transmitting the first CPM including the first object information including a first position of the first object, and position information of the UE,
wherein the second CPM further includes information about second position reliability of the second object information,
wherein the position information of the UE is corrected by applying an offset, based on the second object being the same object as the first object, and
wherein the offset is determined by multiplying a distance between the first position and the second position by a reliability ratio, and
wherein the reliability ratio is a first position reliability related to the position information of the UE divided by a sum of the first position reliability and the second position reliability.

2. The method of claim 1, wherein the second object is determined to be related to the same object as the first object based on the distance less than a preconfigured threshold, and
wherein the preconfigured threshold is determined by applying a weight corresponding to reliability of the position information of the UE to a specific value determined based on reliability of the sensor.

3. The method of claim 1, wherein the first position reliability is determined based on reliability of a global positioning system (GPS) for acquiring the position information of the UE and a number of corrections of the position information of the UE.

4. The method of claim 1, wherein, based on the first object and the second object being the same, and based on the second position reliability being less than a preconfigured threshold, the offset is not applied to the position information of the UE.

5. The method of claim 1, wherein the first CPM further includes information about the offset.

6. The method of claim 1, wherein, based on the second CPM being received from a road side unit (RSU), the offset is determined as a value corresponding to the distance.

7. A user equipment (UE) for transmitting a first collective perception message (CPM) in a wireless communication system, the UE comprising:
a radio frequency (RF) transceiver; and
a processor connected to the RF transceiver,
wherein the processor acquires first object information about a first object through a sensor and controls the RF transceiver to receive a second CPM including second object information including a second position of a second object and to transmit the first CPM including the first object information including a first position of the first object and position information of the UE,
wherein the second CPM further includes information about second position reliability of the second object information;
wherein the position information of the UE is corrected by applying an offset, based on the second object being the same object as the first object, and
wherein the offset is determined by multiplying a distance between the first position and the second position by a reliability ratio, and
wherein the reliability ratio is a first position reliability related to the position information of the UE divided by a sum of the first position reliability and the second position reliability.

8. The UE of claim 7, wherein the second object is determined to be related to the same object as the first object-second based on the distance less than a preconfigured threshold; and
wherein the preconfigured threshold is determined by applying a weight corresponding to reliability of the position information of the UE to a specific value determined based on reliability of the sensor.

9. The UE of claim 7, wherein the first position reliability is determined based on reliability of a global positioning system (GPS) for acquiring the position information of the UE and a number of corrections of the position information of the UE.

10. The UE of claim 7, wherein, based on the first object and the second object being the same, and based on the second position reliability being less than a preconfigured threshold, the offset is not applied to the position information of the UE.

11. A computer readable storage medium containing at least one computer program for causing the at least one processor to perform an operation for transmitting a first collective perception message (CPM) by at least one processor in a wireless communication system for supporting sidelink, comprising:
at least one computer program configured to cause the at least one processor to perform the operation of transmitting the first CPM; and a computer readable storage medium configured to store the at least one computer program therein, wherein the operation includes acquiring first object information about a first object through a sensor, receiving a second CPM including second object information including a second position of a second object, and transmitting the first CPM including the first object information including a first position of the first object and position information of the UE;

wherein the second CPM further includes information about second position reliability of the second object information;

wherein the position information of the UE is corrected by applying an offset based on the second object being the same object as the first object; and wherein the offset is determined by multiplying a distance between the first position and the second position by a reliability ratio, and wherein the reliability ratio is a first position reliability related to the position information of the UE divided by a sum of the first position reliability and the second position reliability.

\* \* \* \* \*